(12) United States Patent
Yamaguchi

(10) Patent No.: US 7,493,116 B2
(45) Date of Patent: Feb. 17, 2009

(54) MOBILE NETWORK SYSTEM

(75) Inventor: Yuji Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 133 days.

(21) Appl. No.: 10/871,601

(22) Filed: Jun. 18, 2004

(65) Prior Publication Data

US 2004/0229609 A1    Nov. 18, 2004

Related U.S. Application Data

(63) Continuation of application No. PCT/JP02/00281, filed on Jan. 17, 2002.

(51) Int. Cl.
*H04Q 7/20* (2006.01)

(52) U.S. Cl. .................. 455/432.1; 455/433; 455/435.1

(58) Field of Classification Search ................ 455/411, 455/410, 461, 557, 558, 432.1, 432.2, 432.3, 455/433, 435.1, 550.1, 517, 445, 456.1
See application file for complete search history.

(56) References Cited

U.S. PATENT DOCUMENTS

| | | | |
|---|---|---|---|
| 5,818,918 A | | 10/1998 | Fujii |
| 5,884,157 A | | 3/1999 | Karmi |
| 6,115,608 A | | 9/2000 | Duran et al. |
| 6,556,820 B1 | * | 4/2003 | Le et al. ..................... 455/411 |
| 6,594,498 B1 | * | 7/2003 | McKenna et al. ........... 455/517 |
| 2001/0046860 A1 | * | 11/2001 | Lee ............................. 455/426 |
| 2003/0076803 A1 | * | 4/2003 | Chuah ........................ 370/338 |
| 2003/0086418 A1 | * | 5/2003 | McIntosh et al. ............ 455/433 |

FOREIGN PATENT DOCUMENTS

| | | |
|---|---|---|
| EP | 0 888 025 | 12/1998 |
| JP | 8-237731 | 3/1996 |
| JP | 8-182037 | 7/1996 |
| JP | 08-331647 | 12/1996 |
| JP | 11-136773 | 5/1999 |
| JP | 2000-083017 | 3/2000 |
| JP | 2001-285372 | 10/2001 |
| WO | WO 01/74100 A1 | 10/2001 |

* cited by examiner

*Primary Examiner*—Sam Bhattacharya
(74) *Attorney, Agent, or Firm*—Katten Muchin Rosenman LLP

(57) ABSTRACT

In order to provide a configuration that allows system building with a relatively simple configuration when building a 3G mobile network system, a RAN part (11, 12, 13, 111, 112, 113, 114, 121, 122), a MSC (131), and a SGSN (132) are shared by a plurality of carriers, and subscriber information is consistently exchanged between a VLR of the shared MSC and HLRs of MSCs (211, 221, 231) for respective carriers, thereby maintaining the consistency with each other.

19 Claims, 15 Drawing Sheets

| SUBSCRIBER NUMBER |
|---|
| MOBILE STATION (TERMINAL) NUMBER |
| LOCATION INFORMATION OF MOBILE STATION |
| ACCOUNTING INFORMATION |
| SERVICE CONTRACT INFORMATION |
| AUTHENTICATION INFORMATION |
| INTERCONNECTION INFORMATION |
| OTHERS |

MOBILE NETWORK SYSTEM

CROSS-REFERENCE TO RELATED APPLICATION

The present application is a continuation of International Application No. PCT/JP02/000281which was filed on Jan. 17, 2002.

TECHNICAL FIELD

The present invention relates to network sharing methods of mobile networks in a mobile communication network (e.g., a so-called third generation (3G) mobile communication network), and more particularly, to a network sharing method of mobile networks that enables system building with a relatively simple structure when building a 3G mobile network system that realizes use of networks of a plurality of carriers.

BACKGROUND ART

FIG. 1 shows a system building example assuming that a 3G mobile network system is built by using the 2nd and 2.5th generations (2/2.5G) network systems without performing network sharing.

In the system shown in FIG. 1, assuming that communications are performed among 3G subscriber terminals (mobile telephone terminals) 11, 21 and 31 that mainly belong to respective 3G mobile network systems 10, 20 and 30 that are individually built by three different carriers (providers), in a case where the terminal 11 performs communication with the terminal 12, a call transmitted from the terminal 11 is, for example, received by a base station radio apparatus 12 of the carrier 10, and transmitted to a base station control apparatus 13. Then, the call is transmitted to a mobile switch center 24 via: a mobile switch center 14; a mobile communication network 15 of the carrier 10; a public telephone network PSTN; and a mobile communication network 25 of the carrier 20. Thereafter, the call is connected to the terminal 21 via a base station control apparatus 24 and a base station radio apparatus 23.

In a case where the system as mentioned above is assumed, since the 3G systems are separately built by the respective carriers, enormous business investment is required in total. In order to solve such a problem, a concept of so-called network sharing has been proposed in which a mobile communication network is shared among a plurality of carriers.

FIG. 2 shows an example in which a 3G mobile communication network is built by using a known network sharing method. According to the network sharing method, base station radio apparatuses 111 through 114 and base station control apparatuses 121 and 122, for example, are shared among a plurality of carriers. The carriers may build, on their own, mobile switch centers (MSC) 14, 24 and 34, and serving GPRS (global packet radio service) support nodes (SGSN) 16, 26 and 36, in addition to the mobile communication networks 15, 25 and 35 and application servers 17, 27 and 37, respectively. Fundamentally, communication resources that should be built by each of the carriers are limited to those parts relating to: e.g., use conditions of each user, which should be directly managed by each of the carriers; counting of usage fees; and its own specification (know-how).

It should be noted that, here, "a method of sharing only a RAN (radio access network; a network including RNCs, base station radio apparatuses, and terminals) part" is adopted, and routing is performed from the shared RNCs 121 and 122 to the MSCs 14, 24 and 24 and the SGSNs 16, 26 and 36 for the respective carriers in accordance with the kinds of carriers to which terminals (MS) subscribe.

In addition, depending on the size of the network, the MSC and the SGSN are finely classified as shown in FIG. 3: (MSC=MSC+GMSC (gateway mobile switch center)+HLR (home location resister)&EIR; SGSN=SGSN+GGSN (gateway GPRS support node)). However, here, for simplicity, only the MSC and the SGSN are shown as the minimum system image.

DISCLOSURE OF THE INVENTION

However, even in the case of system building as shown in FIG. 2, problems as follows are conceived.

①　It is necessary to add a new switching function (a function of confirming the content of a call and switching the call to a corresponding MSC for each carrier) to the RNCs, which are not originally provided with the switching function, and development costs therefor are enormous. Consequently, the system becomes expensive.

②　Regarding operation modes of the RNCs and the MSCs (the same applies to the SGSNs), each of the RNCs and the MSCs includes a maintenance terminal (apparatus) and sets each other's connection states to station data. It is necessary to set the values such that there is no inconsistency between values of the RNCs and those of the MSCs (such that values of the RNCs and those of the MSCs become the same)(e.g., settings of system suspension for maintenance and increasing the number of lines between the RNCs and the MSCs and settings of test modes). However, a method for directly exchanging information between the maintenance terminals has not been standardized yet. Thus, in a case where network sharing is not performed, a NMS (network management system) is provided in a higher layer of the maintenance terminals of the RNCs and the MSCS, thereby adjusting the maintenance terminals (see FIG. 4). In this case, since the RNCs and the MSCs are administered by the same carrier, care can be taken by using the NMS in the aforementioned manner.

However, in a case where the above-mentioned network sharing is performed and "the method of sharing only the RAN part" is adopted, the RNCs and the MSCs are administered by different carriers. Thus, it is conceivable that total management by installing the NMS may cause a problem in interests of the carriers. For example, since the NMS is provided with a function of controlling the RNCs and the MSCs, there is a possibility that accounting information, which is a confidential matter, of the RNCs and the MSCs may be leaked/falsified (manipulation of accounting information) and the station data may be falsified (e.g., no charge for specific subscribers) (It is possible to control occurrence of such situations by means of software. However, there is a possibility that the software may be altered during operation, which may cause problems among those carriers having conflict of interest (in a competitive relationship).

Because it is impossible to safely use the NMS for the foregoing reasons, it is necessary to exchange, set, and confirm information by performing, for example, phone communication between the RNCs and the MSCs, and there is a high possibility of such operations being difficult, particularly among competitive carriers. Hence, it cannot be said that such a system is suitable for practical use in terms of operation.

③　The SGSNs are apparatuses for interfacing with a PDN (packet network) and may be fundamentally shared among the carriers. However, in the system of FIG. 2, an MSC is installed by each carrier. Hence, the SGSNs cannot be shared and costs are increased.

④　Resources to be used are increased.

That is, in a system configuration of a MSC separation method by means of a RNC (i.e., the configuration of FIG. 2), calls are branched out from the RNCs to the MSCs of the respective carriers in accordance with the kinds of carriers of the sending terminals. For example, when a telephone call is made between terminals (e.g., 11 and 21) that are subscribers of different carriers in the same RAN, in "the MSC separation method by means of a RNC", the call is connected via: MSC (e.g., 14) of the carrier of a sending subscriber→2/2.5G mobile network (e.g., 15) of the carrier of the sending subscriber→PSTN→2/2.5G mobile network (e.g., 25) of the carrier of a receiving subscriber→MSC (e.g., 24) of the receiving carrier. Hence, resources to be used are large in quantity.

In order to solve the above-mentioned problems, in the present invention, the RAN part (11, 12, 13, 111, 112, 113, 114, 121, 122) is shared, and further, a MSC (131) and a SGSN (132) are shared among a plurality of carriers (providers). The shared MSC includes a VLR (131*a*), which always exchanges subscriber information with HLRs of MSCs (211, 221, 231) for respective carriers. Hence, the VLR of the shared MSC always has the latest subscriber data of subscriber terminals (11, 12 and 13) in a shared mobile network system (100). Consequently, when a call is connected at the time of communication between terminals subscribing to different carriers in the shared mobile network, a predetermined exchange process can be performed via only the shared MSC, without using a MSC for individual carrier. Accordingly, it is possible to significantly reduce radio resources required for connection.

Additionally, on this occasion, by providing a mask function for preventing leakage and falsification of, for example, subscriber information that the VLR of the shared MSC has, it is possible to prevent in advance occurrence of security problems among carriers by also sharing the MSC.

Further, by sharing the RAN part and the MSC, total management of the RNCs and the MSC by means of the NMS becomes possible. Thus, it is possible to make a management process effective.

BEST MODE FOR CARRYING OUT THE INVENTION

Hereinafter, a detailed description will be given of preferred embodiments of the present invention, with reference to the drawings.

The present invention sets up a network sharing system by using "the function of using a network by a plurality of carriers" that a mobile switching center MSC has, thereby enabling the effective use of functions of existing resources, suppressing resources to be newly installed to be minimum, and building a 3G mobile network system with a relatively simple configuration.

Figure 5:
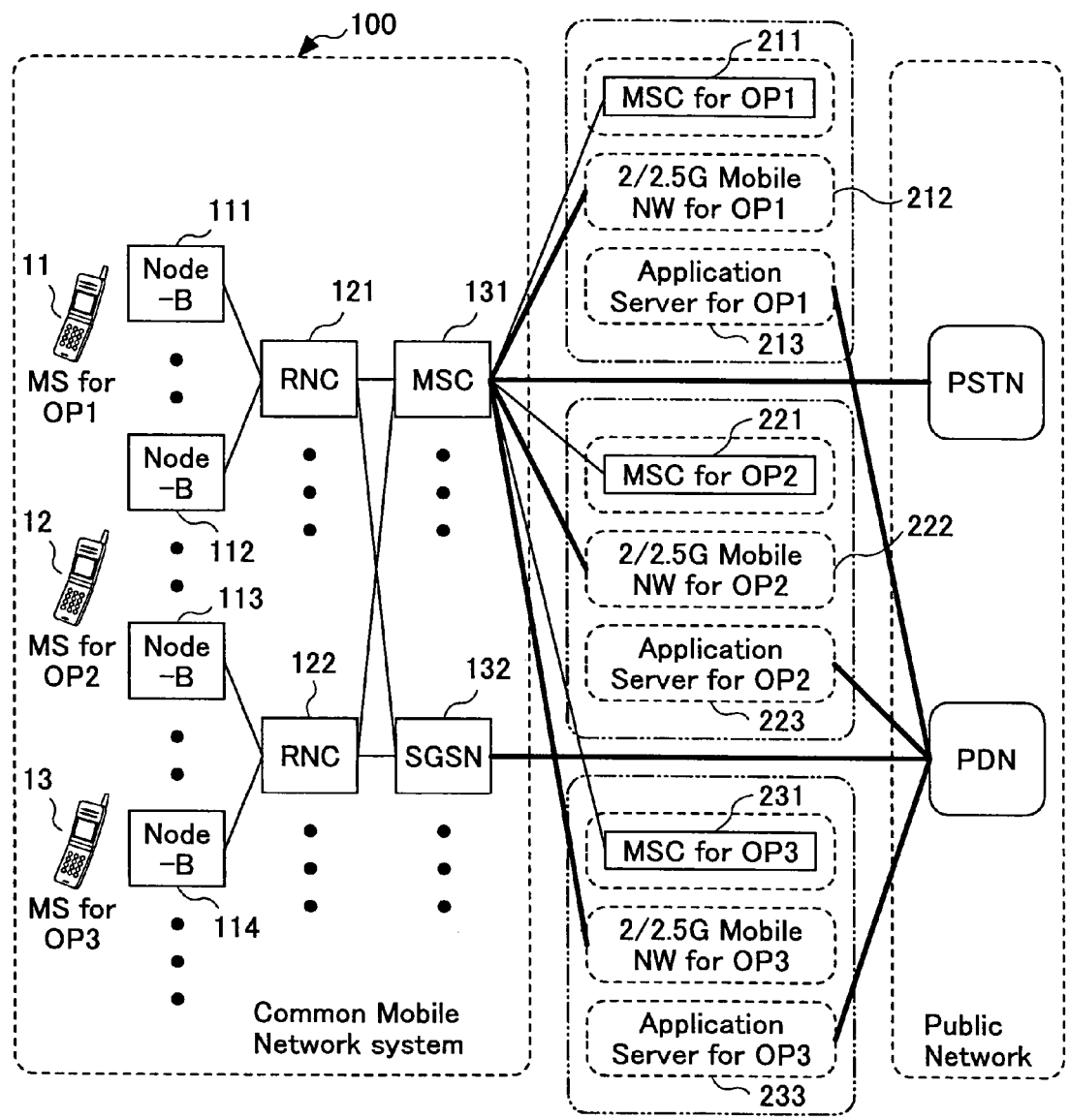
FIG. 5 is a diagram showing a general system configuration of one embodiment of the present invention.

FIG. 5 shows a general system building example according to one embodiment of the present invention.

In this case, first, the shared 3G mobile network (Node-B/RNC/MSC/SGSN) 100 is built by a plurality of carriers. In addition, 3G core apparatuses (MSC/SGSN) 211, 221 and 321 are provided for the respective carriers. The MSCs 211, 221 and 321 for respective carriers are connected to the shared MSC 131 of the common mobile network 100. The shared MSC 131 and the MSCs 211, 221 and 321 for the respective carriers are connected by using a known inter-base signal method (e.g., CCS7).

Next, a description will be given of a control system adopted in the system. It should be noted that information of fees, the kinds of services, and position, for example, of the subscriber terminals 11, 12 and 13 are managed by one of the MSCs 211, 221 and 231 managed by the respective carriers.

Here, as mentioned above, "the function of using a network by a plurality of carriers" that the mobile switching center MSC (131) has is used. That is, in a case where a telephone call is made between subscriber terminals whose information of, for example, fees, the kinds of services, and position is managed by different carriers in the shared mobile network (including the shared MSC 131 and 132) 100, the MSC 131 accesses the MSC (211, 221, 231, etc.) managing the above-mentioned information of a caller subscriber terminal and obtains the information, performs a call connection process to the MSC (here, 221 is assumed) of a carrier managing service information of a receiver subscriber terminal, and after the process, feeds back process information (e.g., duration of call and fees) to the source from which the information is obtained. In the aforementioned manner, the MSCs 211, 221 and 231 of the respective carriers can process service orders with respect to subscribers and perform accounting. Hence, it is possible even for competitive carriers to easily manage network sharing. Additionally, in this case, by adding a masking configuration that prevents the VLR of the shared MSC 131 from being changed by individual carriers by means of hardware or software, it is possible to eliminate the possibility of occurrence of, for example, falsification of data by individual carriers.

With the above-mentioned configuration, the following effects can be obtained.

a) By providing the shared MSC and allowing the shared MSC to have the switching function, the need for newly adding the switching function to the functions of an existing RNC is eliminated.

b) Regarding the operation modes of the RNCs and the MSCs, by setting the range that is shared in network sharing to the mobile network 100 including the MSC 131, a mode is achieved in which the above-mentioned NMS can be used. Hence, it is possible to easily maintain operational compatibility between the RNCs and the MSCs.

c) By performing switching (the switching process) by the shared MSC, the call connection for the call between the terminals (e.g., 11 and 12) in the network, which is explained at the beginning of the Background Art, may be performed via only the base station 111→the RNC 121→the MCS 131→the RNC 122→the base station 113, for example. Thus, it is possible to significantly reduce required resources.

d) It is unnecessary to provide a switching function to the MSCs for the carriers. That is, simply stated, it is just necessary that a HLR (home location register) storing service information be provided to the MSCs 211, 221 and 231 for the carriers and that the MSC 131 be able to perform reading and writing with respect to the stored contents. However, it should be noted that, here, it is assumed that a MSC for a carrier is provided with "minimum functions that a MSC fundamentally has (e.g., functions of switching, location registration process, and accounting process)+HLR functions". In addition, when a subscriber terminal can access to a 2/2.5G base station, the subscriber terminal may be directly connected to a 2/2.5G mobile network (in fact, connected to a gateway switching center) without using the MSC 131 for carriers. However, in this case, it is preferable that the switching center of the 2/2.5G mobile network manages service information for 2/2.5G of the subscriber terminal.

e) Installation of the SGSN apparatus by each subscriber may be eliminated. That is, by building the above-mentioned system, interfacing with the PDN is performed by means of the shared SGSN (see FIG. 5). Hence, by installing an application server for each carrier in the PDN, it is possible to eliminate the SGSN for each carrier.

f) In a case where communication is made between subscriber terminals that cannot access a 3G radio base station (12, 22, 32, etc.), connection to the MSC 131 is made via the RNC that is in a layer higher than that of a radio base station that a caller subscriber terminal accesses. Then, the MSC (one of 211, 221 and 231) managing service information of the caller subscriber is accessed, and the service information of the subscriber terminal is obtained. A call area is determined from service information of a receiver subscriber terminal, and a signal for calling is transmitted to the receiver subscriber terminal from radio base stations 111, 112, . . . , 114 that belong to the call area. When the receiver subscriber terminal responds to the signal, a communication path within the mobile network 100 is formed.

Accordingly, information (e.g., voice, characters, and image information) transmitted and received between the subscriber terminals is routed within the shared mobile network 100 and is not routed to the 2/2.5G network. Thus, it is possible to prevent resources from being used vainly.

A more specific description will be given of the configuration of the above-mentioned embodiment of the present invention.

It is possible to achieve protection against falsification/leakage of data of the shared MSC by individual carriers by using mutual communication functions among a plurality of carriers and performing call processes by means of the shared MSC 131. However, if an existing MSC is merely applied as is, information of subscribers of other carriers (hereinafter referred to as "individual carriers") may be freely changed or researched by a carrier (hereinafter referred to as "shared carrier") that administers the MSC through accessing the MSC. In other words, accounting of certain subscribers may be deleted (falsification of data) or information may be leaked, for example.

Usually, the HLR manages important information such as subscriber data and accounting data. However, the shared MSC 131 in the system according to the present invention does not use such a HLR. Instead, the shared MSC 131 manages corresponding information by means of a VLR (visitor location register). In the case of the VLR, stored information is appropriately and automatically amended by the HLR of a corresponding individual carrier (here, the HLR of the MSC for a carrier), and all information (e.g., accounting information) thus generated is automatically reflected to the HLR of the corresponding carrier. Thus, fundamentally (except for the above-mentioned normal operation), it is unnecessary for the VLR of the shared MSC to be accessed from outside.

Therefore, by masking in advance by means of hardware or software such that the VLR of the shared MSC cannot be changed or accessed, it is possible to avoid problems of falsification and leakage of relevant data.

g) Regarding the operation modes of the RNCs and the MSCs, in this embodiment, the shared MSC 131 is installed independently from the individual carrier. Thus, it is possible to operate the RAN part and the shared MSC by the same carrier (shared carrier). Hence, a mode is achieved in which the NMS can be used. Additionally, since the shared mobile network 100 is independent, the MSC/SGSN of each individual carrier is not affected by, for example, increasing/decreasing of facilities and tests in the shared mobile network. Accordingly, it is possible to operate the shared mobile network as an independent mobile network and to process subscribers under the network with no distinction and without variation.

h) The above-mentioned reduction of required resources according to the present invention becomes possible in the following manner.

In this embodiment, those service subscribers subjected to a call process by the shared MSC 131 are handled equally as common subscribers. Hence, it is possible for the shared MSC to perform call connection without distinguishing carriers (As mentioned above, it is possible to reduce required resources in the routing process).

i) The elimination of the SGSN for carrier is achieved in the following manner.

Since interfacing with the packet network (PDN) is performed by means of the shared SGSN 132, the SGSN for each individual carrier is not required. Here, connection to the PDN, which is installed independently from each individual carrier, is collectively performed by the shared SGSN. Information regarding subscriber information and accounting, which is necessary for the SGSN, is updated as needed by exchanging information with the HLR of the MSC of the individual carrier via the VLR of the shared MSC. Those packets used by a terminal can be obtained via the PDN by performing communication with the data application server that is installed for each individual carrier. Generally, application servers 213, 223 and 233 of the respective carriers are installed in the PDN, which is provided beyond the shared SGSN (GGSN) 132.

j) Reduction of a switch part of the MSC for individual carrier is achieved in the following manner.

In some cases, it is necessary for the MSCs 211, 221 and 231 for the individual carriers to make connection with a 2/2.5G mobile network in addition to the 3G RAN. However, such subscribers of carriers can be connected through switching by the shared MSC 131, and may be directly connected to the 2/2.5G mobile networks of the relevant carriers. That is, it is possible for the shared MSC to perform routing to a target 2/2.5G mobile network based on a telephone number transmitted from a terminal. With such a system configuration, it is possible to eliminate the switch part for voice (CS: circuit switching) from the MSCs (for 3G) 211, 221 and 231 for the individual carriers.

Hereinafter, an individual description will be given of the configuration according to this embodiment.

First, a description will be given of location registration of terminals and a transfer function of HLR information.

Figure 6:
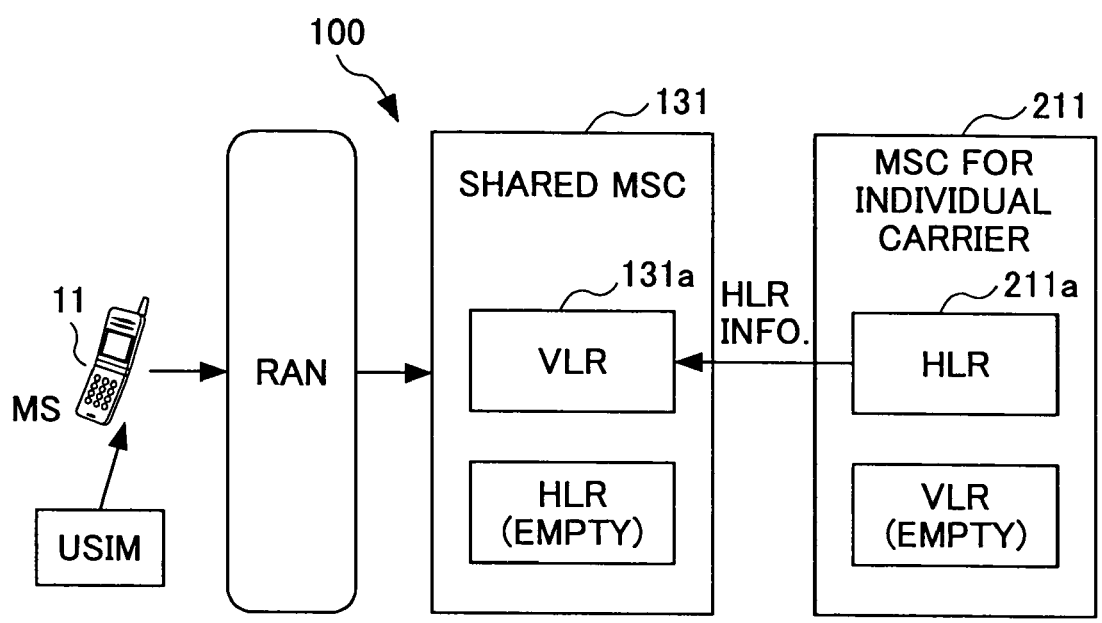
FIG. 6 is a block diagram for explaining position registration of a mobile terminal and a subscriber information transfer operation according to one embodiment of the present invention.
Figure 7:
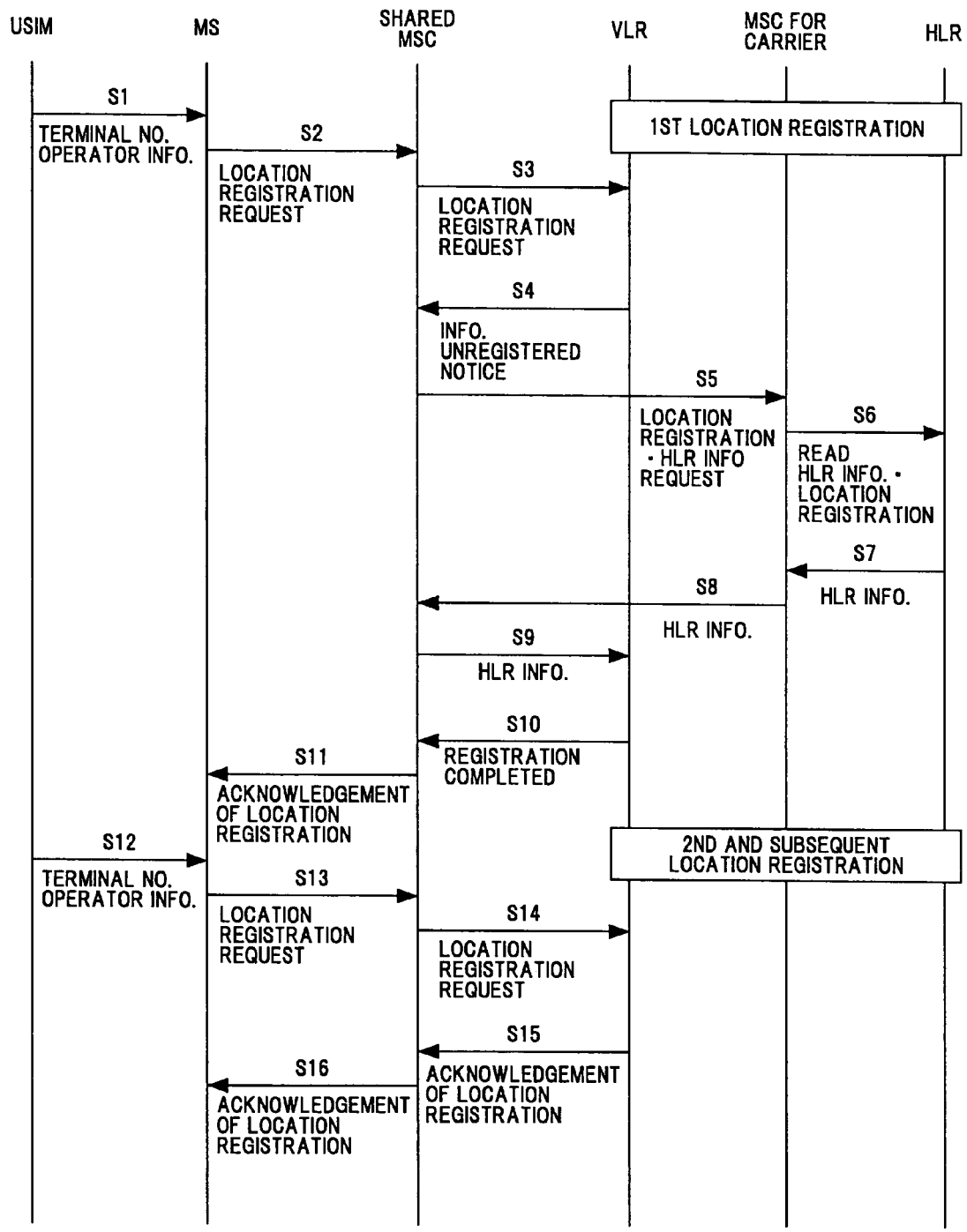
FIG. 7 is a procedure flow diagram for explaining location registration of a mobile terminal and a subscriber information transfer operation in one embodiment of the present invention.

In the shared mobile network 100, first, when a terminal (e.g., 11) is powered on, location registration of the terminal is performed (see FIGS. 6 and 7: however, it should be noted that, for simplicity of explanation, processes such as terminal authentication are omitted).

First, when the power of the subscriber terminal 11 is turned ON, identification information (e.g., the telephone number and the terminal identification code) of the subscriber terminal is transmitted to the shared MSC 131 via the radio base station RNC. In this case, the terminal obtains the identification information from a USIM (universal subscriber identify module) incorporated therein (S1-S2 of FIG. 7).

When the terminal information (service information of the terminal) does not exist in the VLR 131a of the shared MSC 131 (the state where the information is not obtained from the HLR of the MSC for the individual carrier), the shared MSC determines that a new subscriber is interconnected from another network, and the shared MSC 131 accesses the switching center (MSC) 211 corresponding to the carrier identification information included in the received identification information (subscriber number) by using an inter-base signal method and requests service information of the subscriber (S3-S5). It should be noted that the MSC 131 stores in advance a corresponding relationship between carrier identification information and information of the MSCs for the individual carriers, and specifies and accesses a MSC for an individual carrier in accordance with the corresponding relationship. Consequently, the service information of the relevant subscriber terminal is transmitted from the MSC 211 for carrier to the shared MSC 131, and the network to which interconnection is made is recorded in a HLR 211a of the switching center (MSC) 211 of the subscriber (S6-S8).

Next, the shared MSC 131 registers in the VLR 131a the service information and location information of the terminal 11 (location area information of the base station to which the subscriber terminal accesses) (e.g., available services and methods of accounting) (S9-S11). When there is a subsequent request from the terminal, it is possible to perform processes based on the VLR information stored in the shared MSC, without requesting the subscriber information from the MSC for carrier each time (S12-S16). In addition, it is preferable that the VLR information be deleted under the condition that, for example, location registration is not performed for a predetermined time period after update of the HLR.

Figures 8, 9:
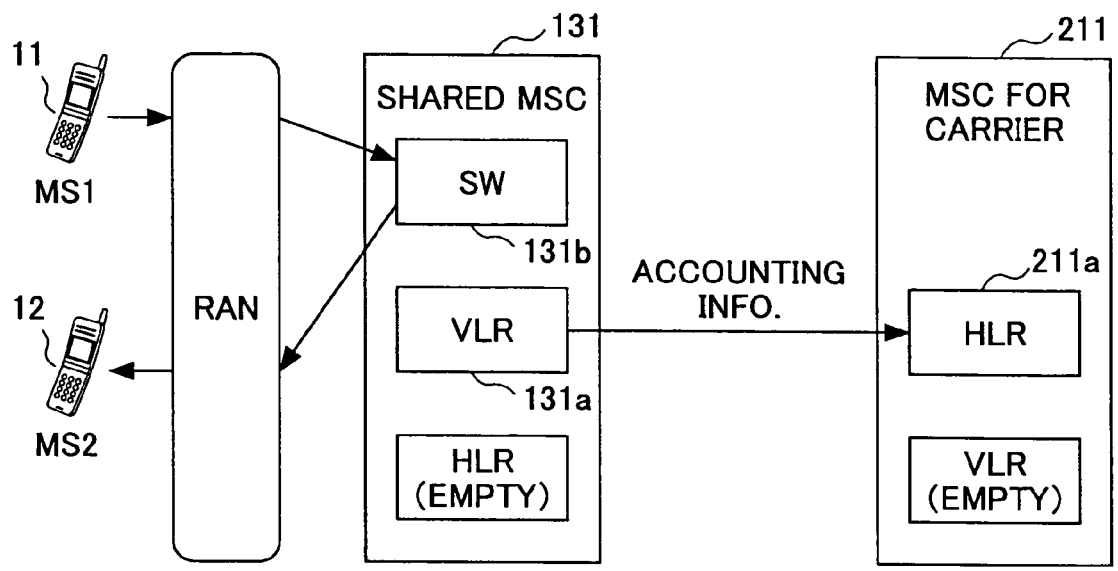
FIG. 8 is a block diagram for explaining call connection and an accounting information transfer operation in one embodiment of the present invention.
FIG. 9 is a diagram showing an example of items of information stored in a HLR and a VLR.
Figure 10:
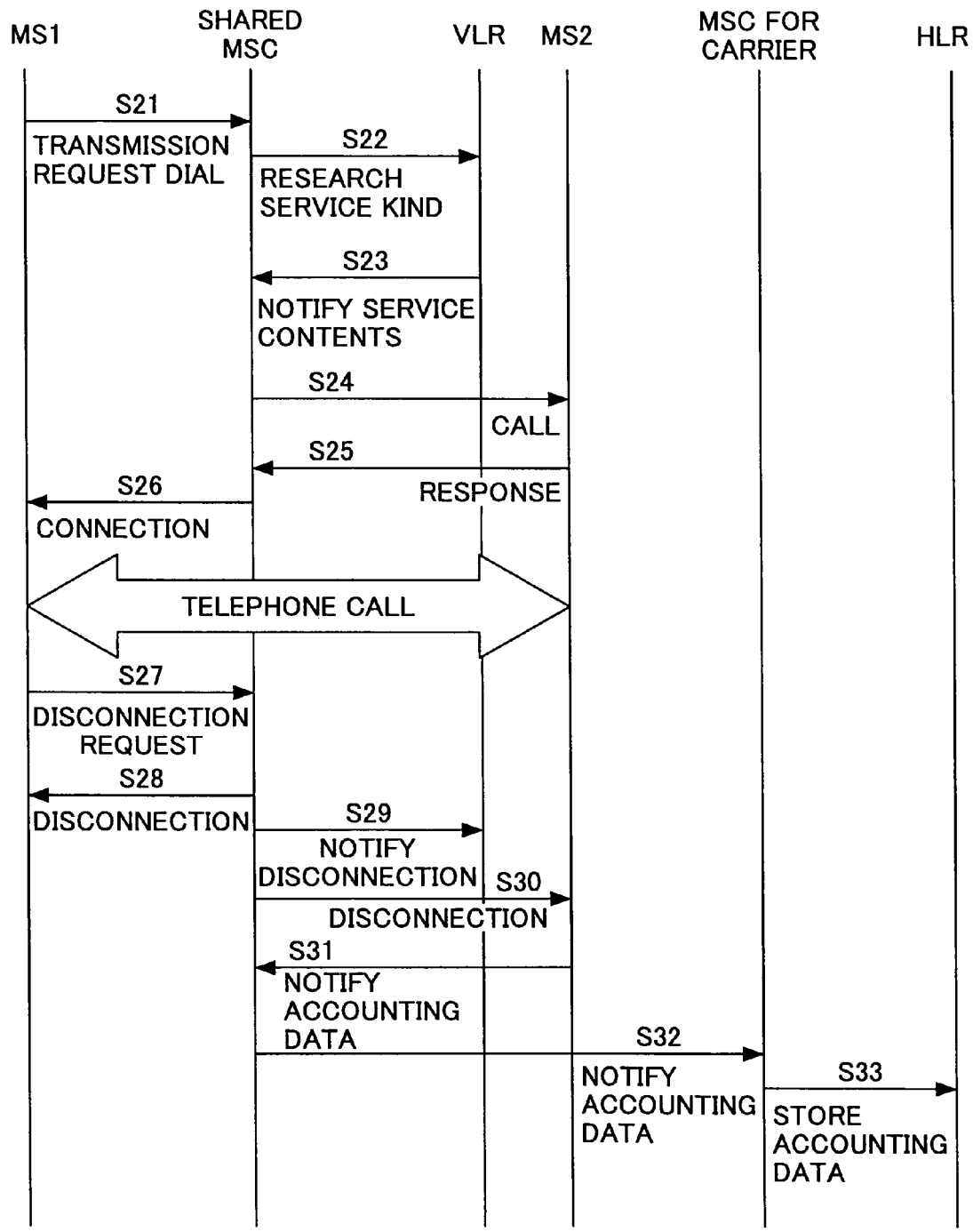
FIG. 10 is a procedure flow diagram for explaining call connection and an accounting information transfer operation in one embodiment of the present invention.

Next, referring to FIGS. 8 and 10, a description will be given of a call request operation of a call (an example of connection within the same mobile network).

A call from the sender terminal 11 is connected to the receiving terminal 12 by: calling the receiving terminal 12 from a base station within a location registration area indicated in service information (that is stored in the VLR); when there is a response, the call is returned by the switch part (SW) 131b in the shared MSC; and the call is connected to the receiving terminal 12 via the base station that returns the response (S21-S26). It should be noted the service that can be enjoyed by each subscriber is determined based on service information (information copied from the HLR 211a of the MSC for carrier) that is stored in the VLR 131a and belongs to the subscriber (S22-S23). When the telephone call ends, accounting information (e.g., duration of call, information of the distance between a sender subscriber terminal and a receiver subscriber terminal, and accounting information) temporarily stored in the VLR 131a is transferred to the HLR 211a of the MSC for carrier to which the subscriber belongs (S27-S33). FIG. 9 shows information that is set to the HLR 211a and the VLR 131a.

Figure 11:
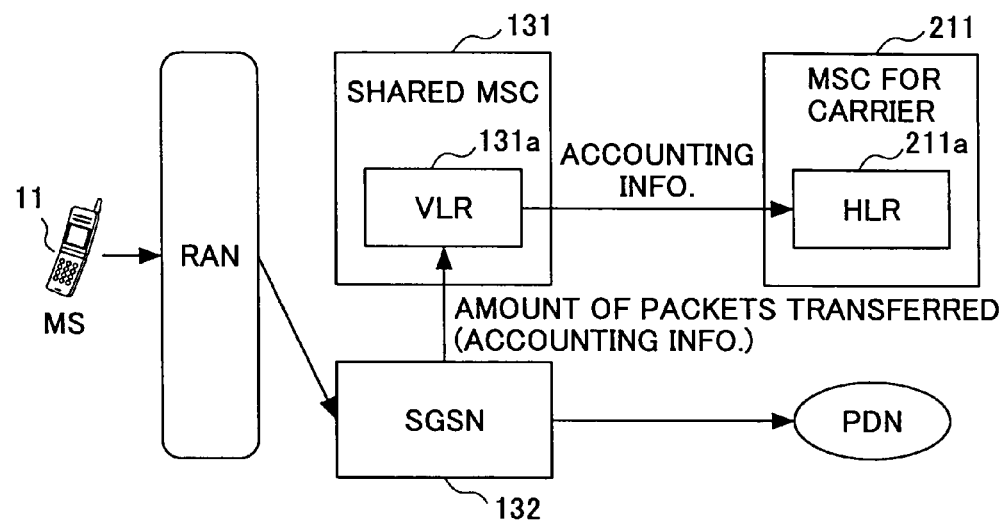
FIG. 11 is a block diagram for explaining packet data transfer and an accounting process operation in one embodiment of the present invention.
Figure 12:
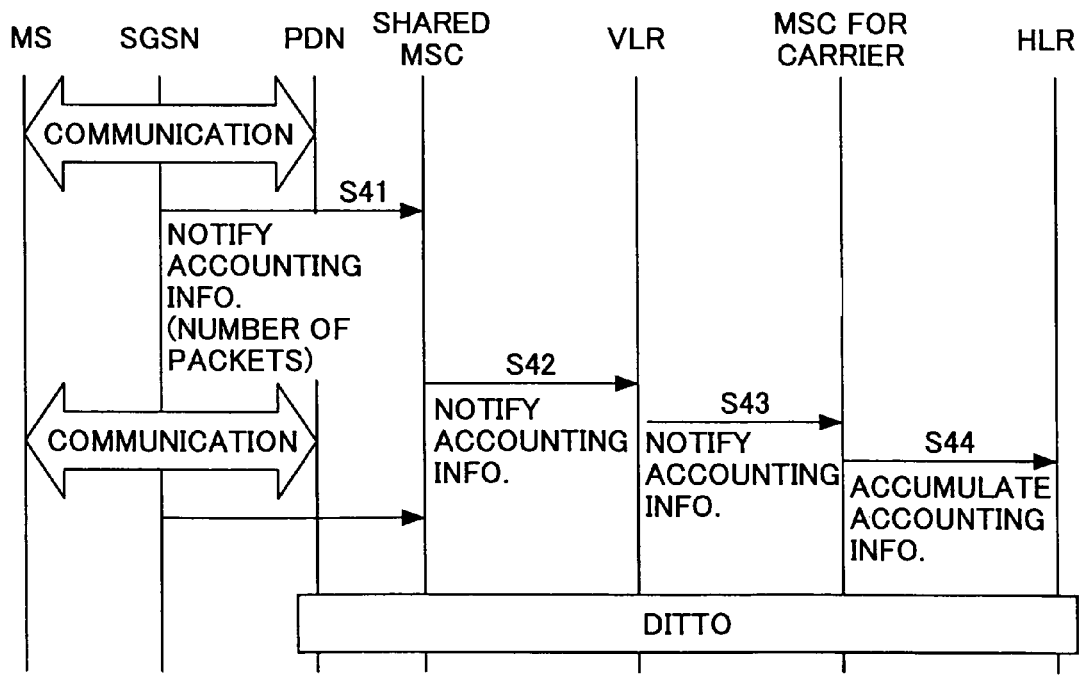
FIG. 12 is a procedure flow diagram for explaining the packet data transfer and the accounting process operation in the embodiment of the present invention.

Next, referring to FIGS. 11 and 12, a description will be given of a process of packet data call.

Packet data are transferred to the PDN via the shared SGSN 132. The SGSN counts the number of transferred packets, and the counted value is transferred to the shared MSC 131 as accounting information, and in the end, the counted value is accumulated in the HLR 211a provided in the MSC 211 for carrier (S41-S44). In addition, since packets are transferred in a connectionless manner, accounting information is transferred from the SGSN 132 to the VLR 131a and the HLR 211a at regular time intervals.

Figure 13:
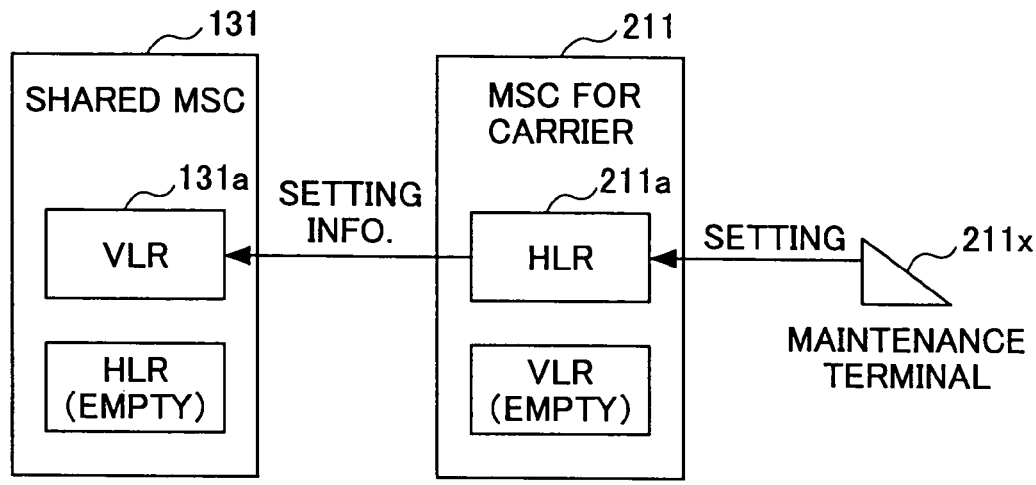
FIG. 13 is a block diagram for explaining a change operation of subscriber information (service order) in one embodiment of the present invention.
Figure 14:
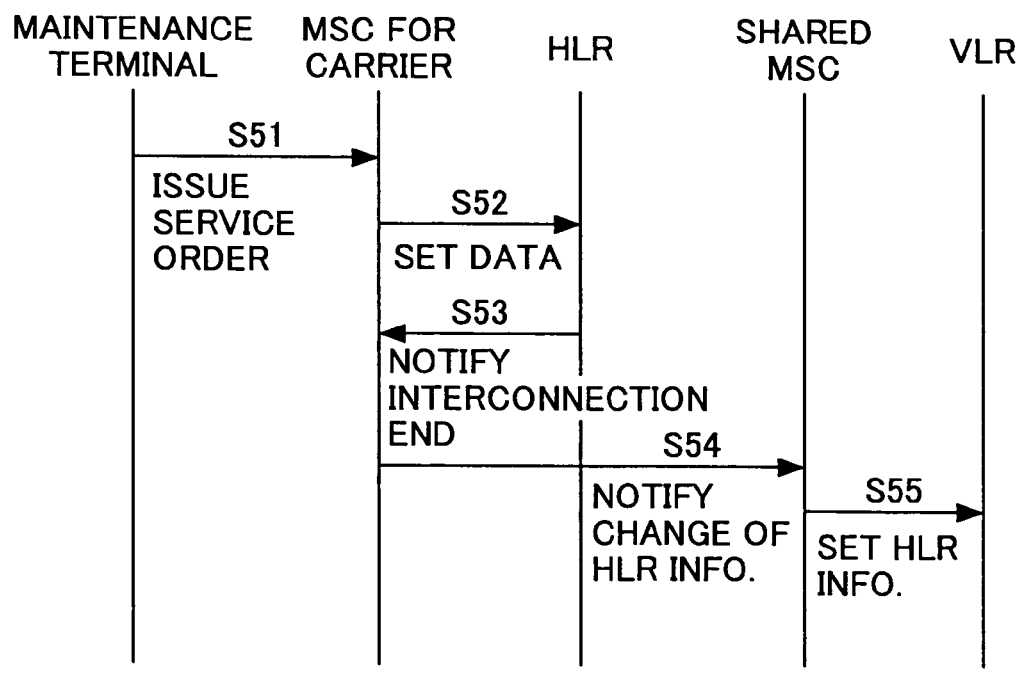
FIG. 14 is a procedure flow diagram for explaining the change operation of subscriber information (service order) in the embodiment of the present invention.

Next, referring to FIGS. 13 and 14, a description will be given of a change operation of subscriber information (service order).

A service order that is input from a maintenance terminal 211x of the MSC 211 for carrier is stored in the HLR 211a of the MSC 211 for carrier, and the information transferred to the shared MSC 131 as the change of the HLR information (a routing destination is stored in the HLR 211a as interconnection information). The shared MSC 131 records the data in the VLR 131a (S51-S55).

Next, a description will be given of effects of the reduction of required resources according to the present invention.

First, referring to FIGS. 15 and 16, a description will be given of the case of a telephone call between terminals that belong to different carriers.

Figure 1:
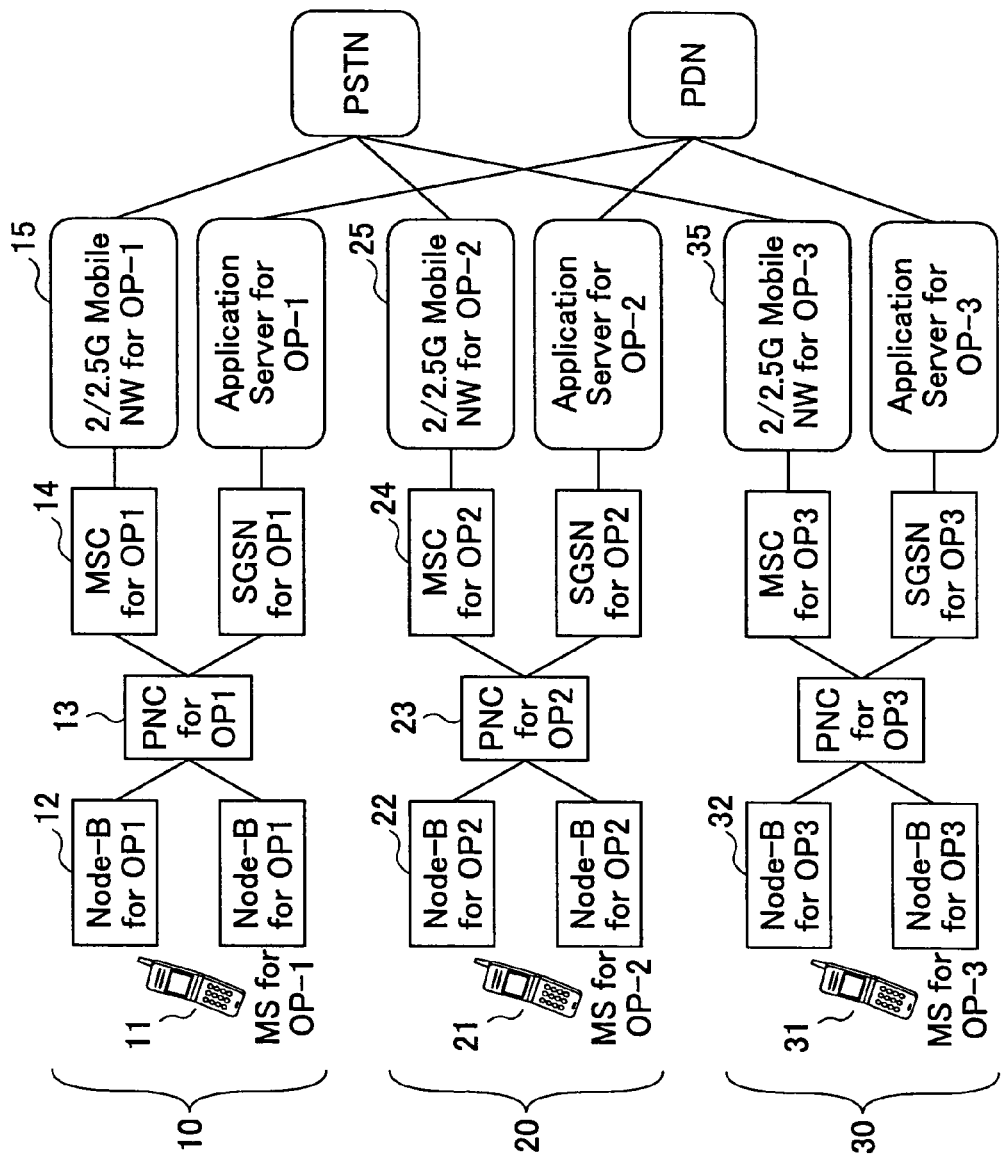
FIG. 1 is a diagram showing, as a conventional example, a system in which it is assumed that each provider builds an individual 3G mobile network system without performing network sharing.

In this embodiment, registered subscribers are equally handled as interconnection subscribers. Hence, it is possible to perform loop connection by means of the shared MSC 131 with respect to a telephone communication between different carriers. Consequently, it is possible to make a connection via the MSC 14→2/2.5G mobile network 15→2/2.5G mobile network 25→the MSC 24 (the example of FIG. 1). Thus, it is possible to significantly reduce usage of connection resources.

Figure 15:
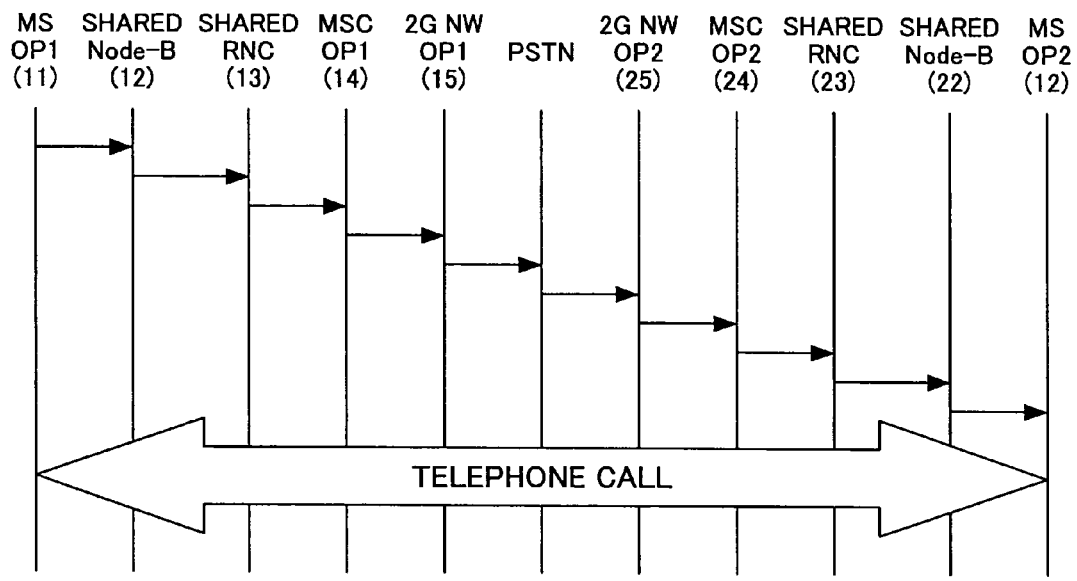
FIG. 15 is a flow diagram showing a procedure for making a connection between terminals of different providers in a system of prior art.
Figure 16:
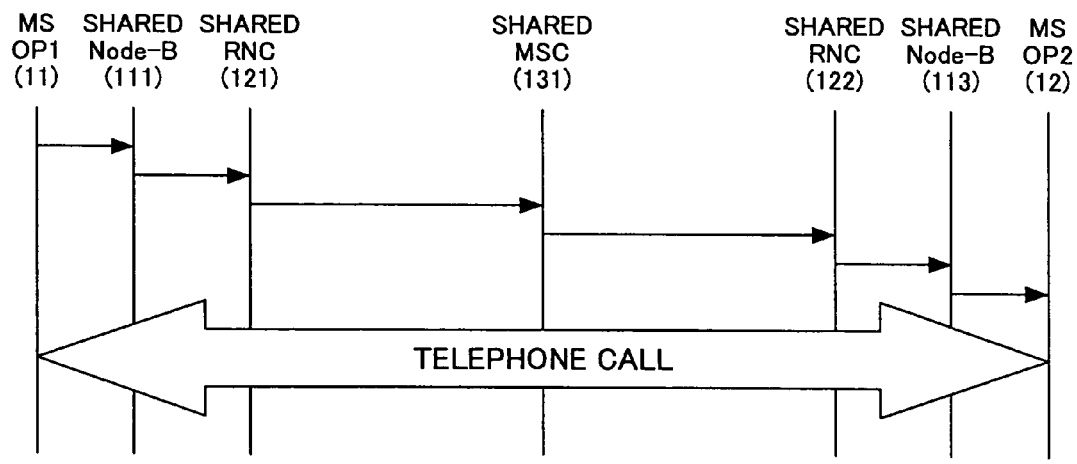
FIG. 16 is a flow diagram showing a procedure for making a connection between terminals of different providers in a system according to one embodiment of the present invention.

That is, in prior art, as shown in FIG. 15, connection is made via a lot of connection resources. On the other hand, in the present invention, as shown in FIG. 16, it is possible to significantly reduce required resources. It should be noted that each arrow in FIGS. 15 and 16 corresponds to a setup of a call.

Next, referring to FIGS. 17 and 18, a description will be given of a connection procedure in a case where a telephone call is achieved between a 3G terminal of a carrier and a 2/2.5G terminal of another carrier.

Figure 17:
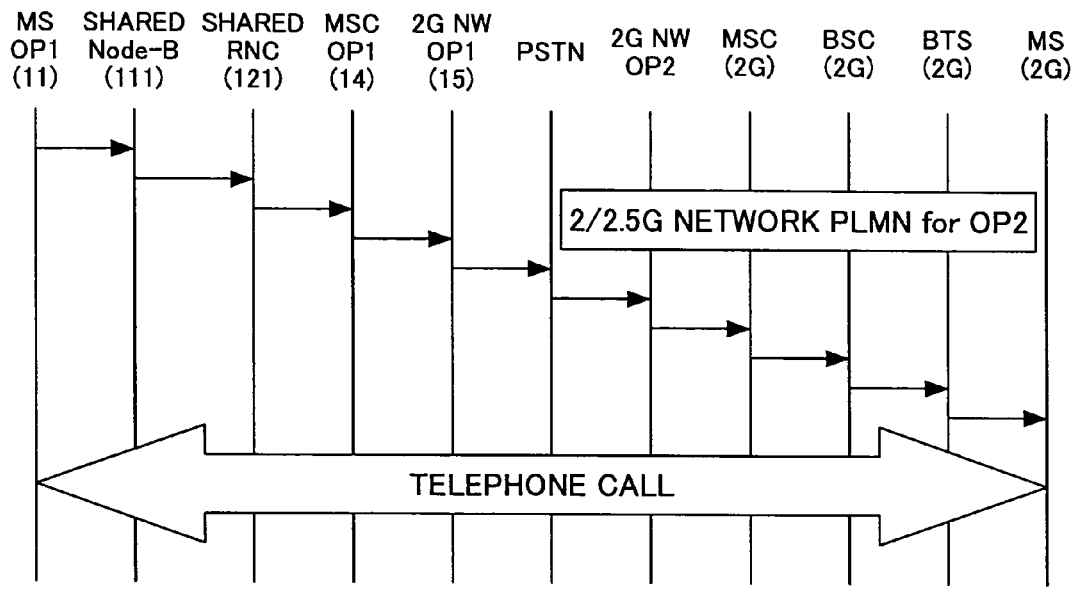
FIG. 17 is a flow diagram showing a procedure for making a connection between a 3G terminal and a 2/2.5G terminal of different providers in a system of prior art.

In the case of the above-mentioned conventional "method of sharing only the RAN part" (see FIG. 2), when a telephone call from a 3G terminal of a carrier 1 to a 2/2.5G terminal (MS) of a carrier 2 (vice versa) is to be achieved, the connection procedure as shown in FIG. 17 is performed.

Figure 18:
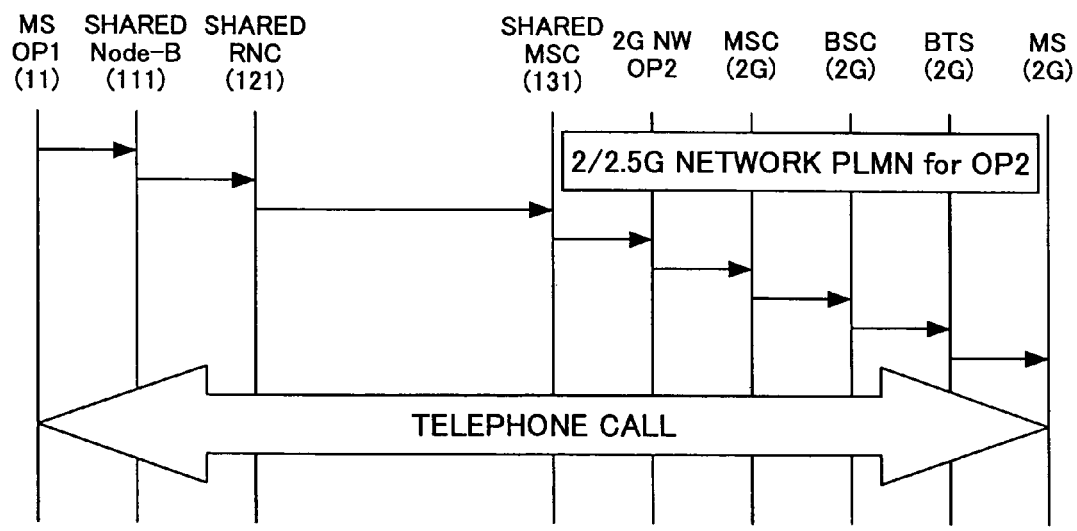
FIG. 18 is a flow diagram showing a procedure for making a connection between a 3G terminal and a 2/2.5G terminal of different providers in a system according to one embodiment of the present invention.

On the other hand, in the embodiment of the present invention (FIG. 5), the connection procedure as shown in FIG. 18 is performed. Thus, small amounts of resources are required.

Further, referring to FIGS. 19 and 20, a description will be given of a connection procedure for achieving a telephone call between a 3G terminal and a 2/2.5G terminal that subscribe to different carriers.

Figure 2:
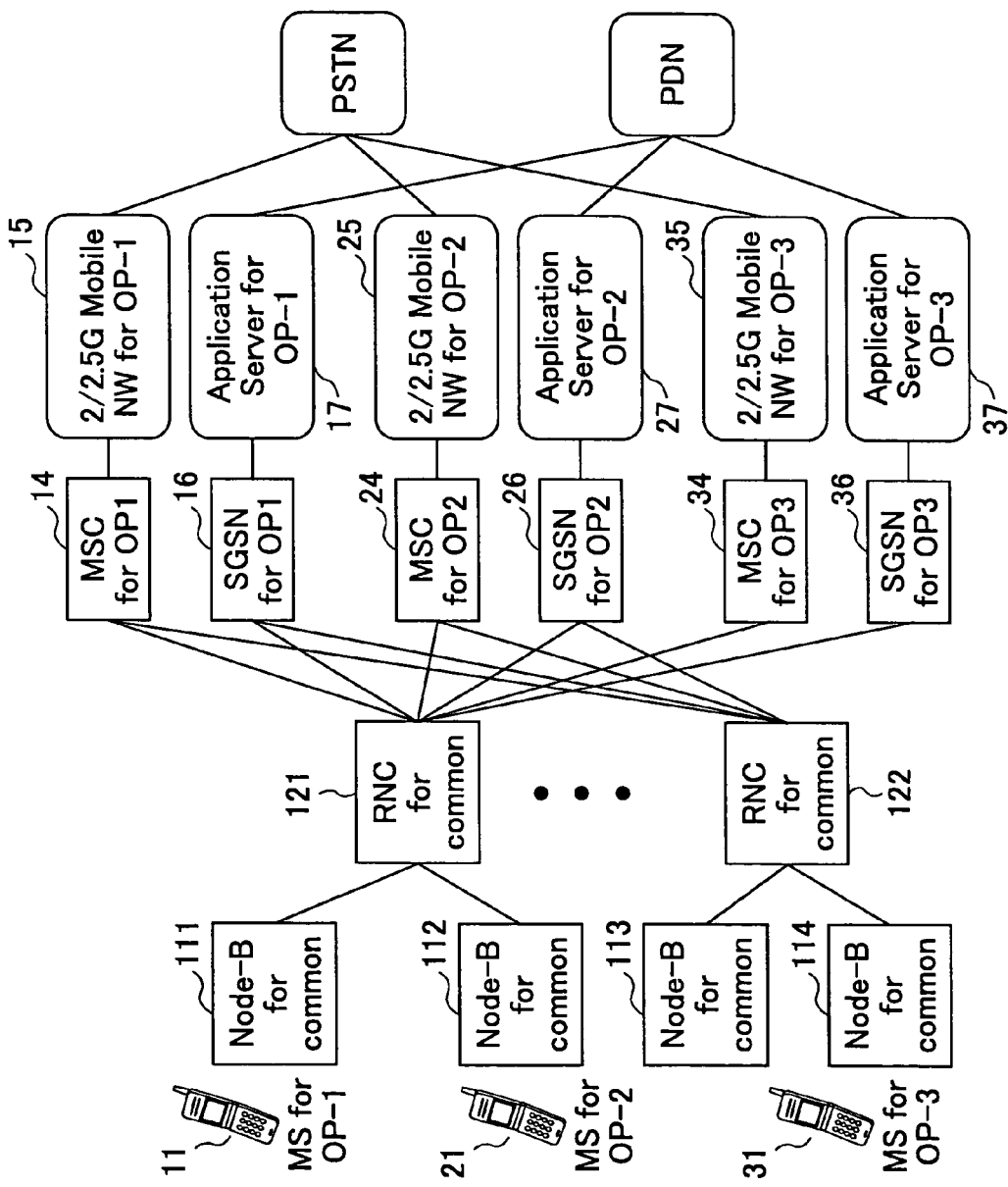
FIG. 2 is a diagram showing, as another conventional example, a system in which it is assumed that a 3G mobile network is built by performing network sharing.
Figure 3:
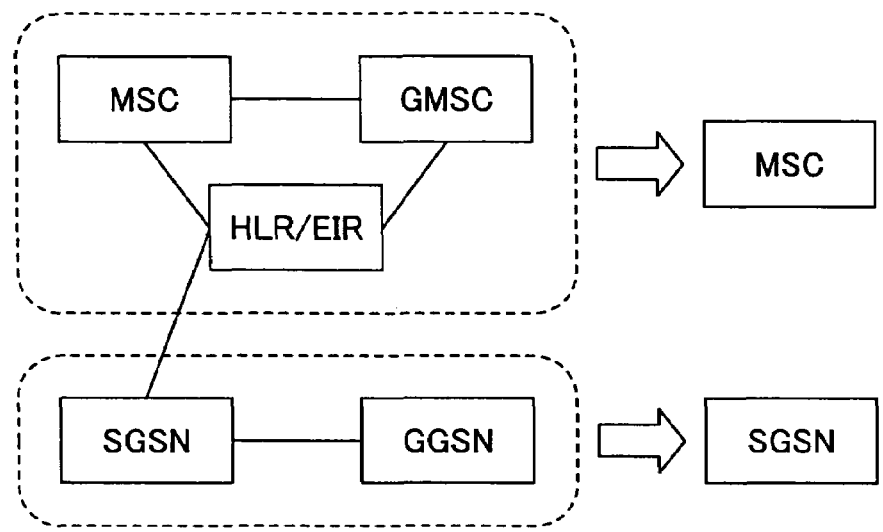
FIG. 3 is a diagram for explaining configurations of a HLR and a SGSN.
Figure 4:
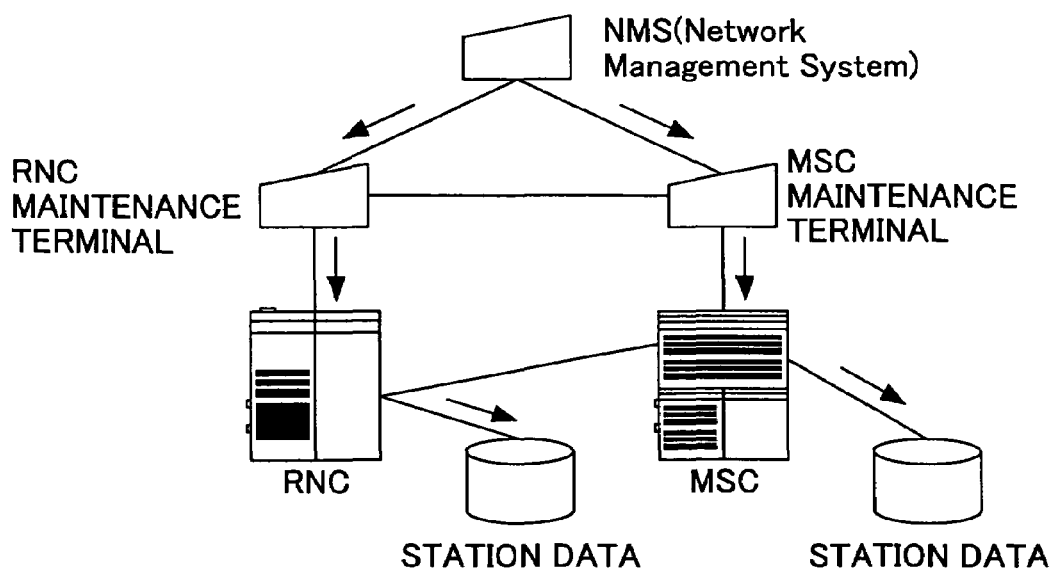
FIG. 4 is a diagram for explaining a management system of an RNC and a MSC by using a NMS.
Figure 19:
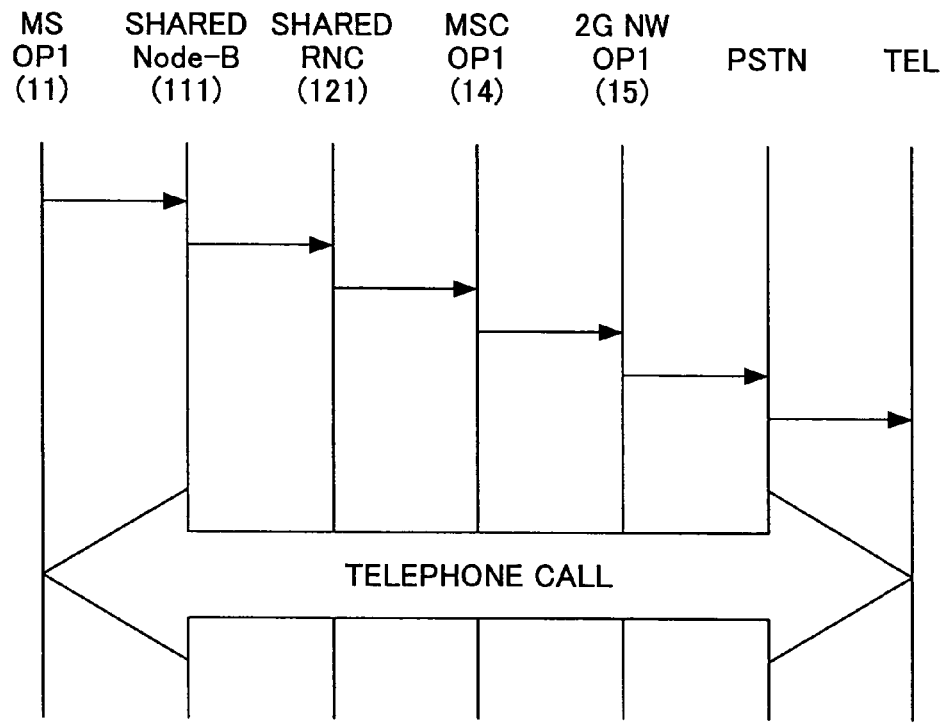
FIG. 19 is a flow diagram showing a procedure for making a connection between a 3G terminal and a telephone in a fixed network (PSTN) of different providers in a system of prior art.
Figure 20:
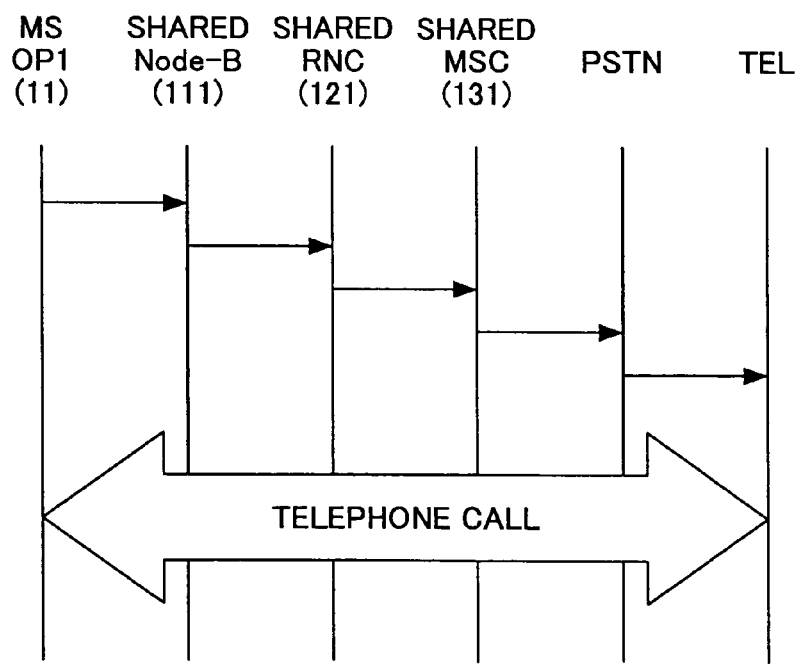
FIG. 20 is a flow diagram showing a procedure for making a connection between a 3G terminal and a telephone in a fixed network (PSTN) of different providers in a system according to one embodiment of the present invention.

In the case of the above-mentioned "method of sharing only the RAN part" shown in FIG. 2 (prior art), when a call is made from the 3G terminal (MS) of the carrier 1 to a telephone in the fixed network (PSTN) (vice versa), the procedure as shown in FIG. 19 is performed. On the other hand, in the present invention, the procedure as shown in FIG. 20 is performed. Also in this case, in the present invention (FIG. 5), only small amounts of resources are required.

Additionally, considering a process of an interconnection subscriber from another network, in a case where a network subscriber, not having a sharing relationship, makes an interconnection to the shared mobile network according to the present invention, a process similar to that in the case of interconnection of the above-mentioned sharing relationship is performed (it may be achieved by the same process except that the location of the HLR becomes further away).

Next, a description will be given of a reason that the SGSN for the individual carriers can be eliminated.

Figure 21:
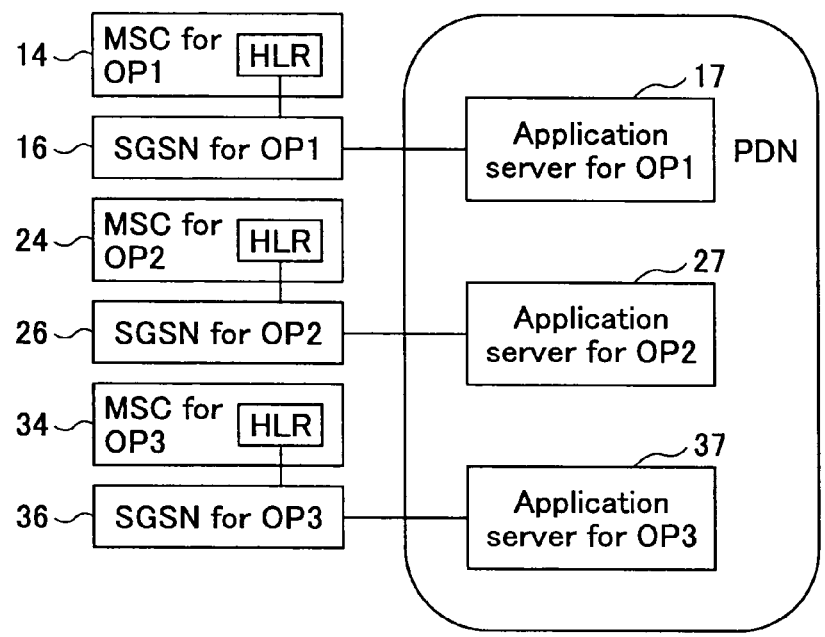
FIG. 21 is a block diagram showing a configuration of a packet communication network in a case where a conventional system is assumed.
Figure 22:
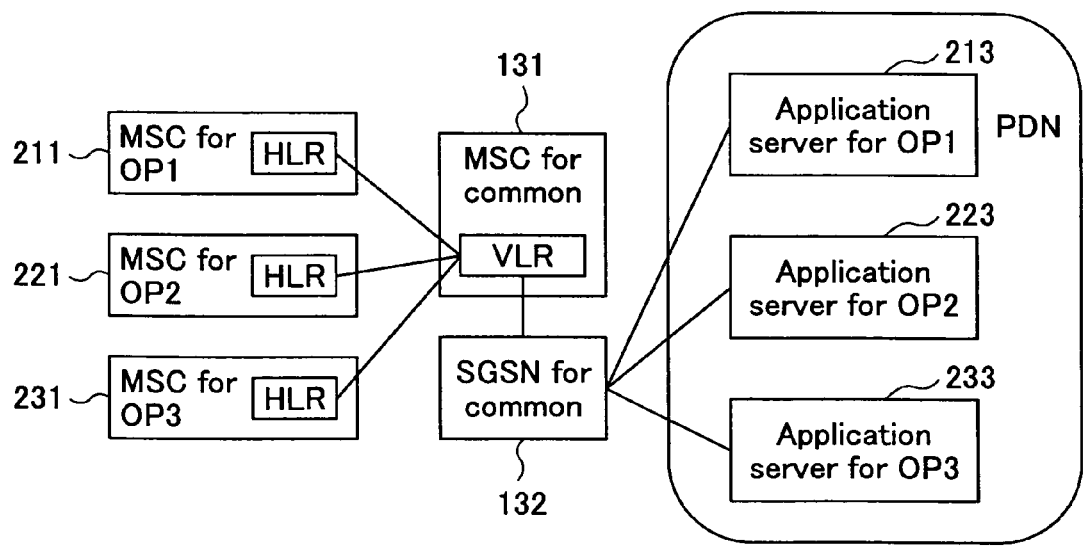
FIG. 22 is a block diagram showing a configuration of a packet communication network in a system according to one embodiment of the present invention.

In the system of the prior art (see FIG. 21), it is necessary to provide the SGSNs 17, 27 and 27 for the respective individual carriers. However, in the MSC sharing system of the present invention (see FIG. 22), the SGSN 132 is also shared, and branching can be made from the shared SGSN 132 to the application servers 213, 223 and 233 for the individual carriers. Hence, it is unnecessary to install the SGSN for each individual carrier.

Next, referring to FIGS. 23 and 24, a description will be given of a reason that the switch for voice (circuit data) can be eliminated in the MSCs for the individual carriers.

Figure 23:
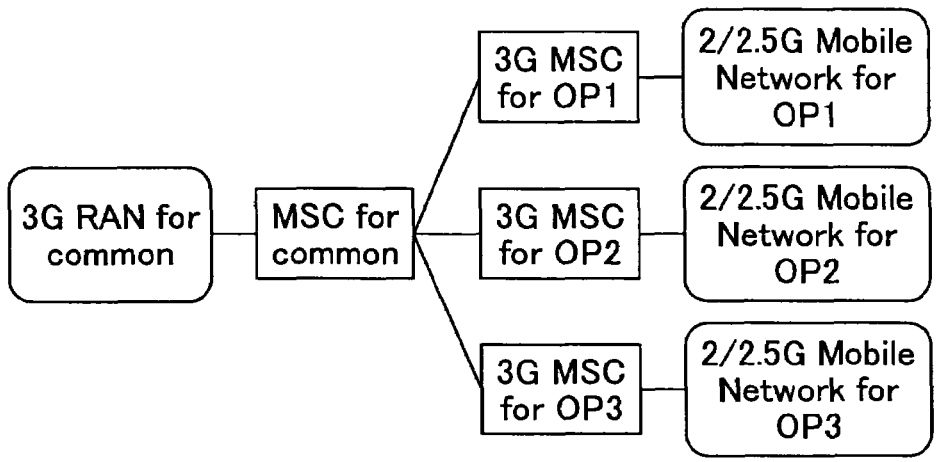
FIG. 23 is a block diagram showing a 3G mobile network assumed as a conventional system.
Figure 24:
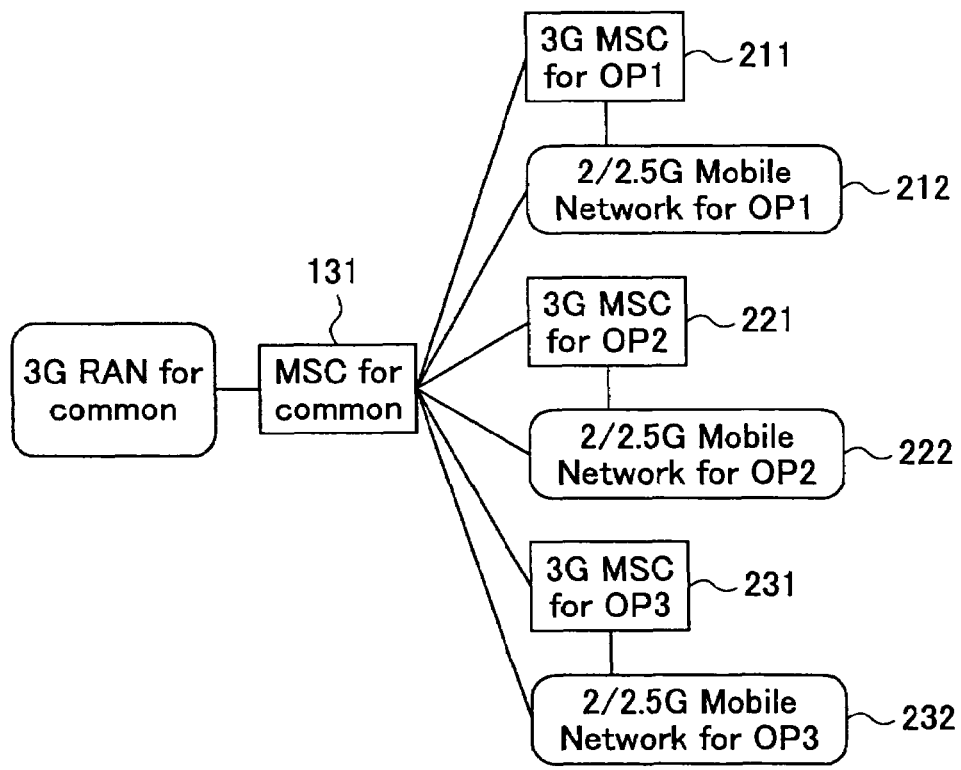
FIG. 24 is a block diagram showing a 3G mobile network in a system according to one embodiment of the present invention.

When a general interconnection method is assumed, the connection as shown in FIG. 23 may be conceived. However, according to the embodiment of the present invention (see FIG. 24), since the MSCs 211, 221 and 231 for the individual carriers do not directly have registered subscribers (do not have the RAN), connection is made from the shared MSC 131 having registered subscribers to the 2/2.5G mobile networks (in fact, gateway switches of the 2/2.5G mobile networks) 212, 222 and 232 of the respective individual carriers in a direct manner or via a gateway switching center (not shown). Accordingly, the 3G switch parts for voice (circuit data) of the MSCs 211, 221 and 231 for the individual carriers can be eliminated (a corresponding 2/2.5G mobile network is selected on the basis of a sender telephone number, thereby performing routing). That is, voice information is directly transmitted from the shared MSC 131 to a relevant mobile network, and accompanying HLR information is transmitted from the shared MSC 131 to a corresponding MSC for individual carrier (see FIG. 24).

In the system according to the present invention, the entire mobile network is shared by the carriers. Hence, it is possible to significantly suppress initial installation costs. Particularly, the switch parts of the MSCs and additional service equipment (e.g., voice mail apparatuses) are expensive. Thus, by sharing the MSC by the carriers, it is possible to expect significant cost reduction effects.

Additionally, regarding a connection route to the 2/2.5G mobile network of each carrier, by making a direct connection to the 2/2.5G mobile network without using the 3G MSC of each carrier, only the HLR may be provided in the MSC for each carrier (the switching function is not required). Thus, it is possible to achieve the MSC configuration having the minimum functions and to expect reduction of costs.

Further, it is possible to perform subscriber management and accounting processes by the core of each carrier. By performing a mask process on the VLR of the MSC that manages the shared network, it is possible to build a system that can prevent, for example, leakage and falsification of data (e.g., accounting).

Furthermore, it is possible to provide a configuration in which the shared core part (MSC and SGSN) can concentrate on operation of the mobile network per se, while the individual carriers can concentrate on operations of services with respect to subscribers (division of labor can be performed).

The core system (MSC/SGSN) of each individual carrier may be installed independently from the shared core (MSC/SGSN), i.e., may be installed in an own building, etc., of each individual carrier. Thus, management by the individual carriers may be simplified.

In addition, the shared MSC may be controlled by interconnection functions (functions similar to those for interconnection among mobile networks of a plurality of providers), and information of the individual carriers is stored/controlled by the MSCs of the respective individual carriers. Hence, management using the NMS (in order to secure consistency between the shared RNCs and the shared MSC) may be applied.

Since switching is performed by the shared MSC, it is possible to reduce resources used for call connection. Therefore, it is possible to reduce system costs and operation costs and to achieve connection within a short time interval.

Since a mode is employed where connection to the PDN is made by means of the shared SGSN, the SGSNs for the individual carriers are not required.

As mentioned above, the present invention provides the switching apparatus (131) installed in the mobile communication network 100 conforming to a protocol, the switching apparatus obtaining service information of the subscriber terminals (11, 12, 13, . . . ) that can perform communication conforming to the protocol from the different storing parts (211a, . . . ) in accordance with the kinds of the subscriber terminals, being formed by the storing means (131a) for storing the obtained service information, performing call processes with respect to the subscriber terminals by using the service information stored in the storing means, and reflecting process result information to the original storing parts (211a, . . . ) from which the information is obtained, and carrying out the call processes with respect to any of the subscriber terminals (11, 12, 13, . . . ) by obtaining the relevant service information and using the service information stored in the storing means.

Additionally, the present invention provides a mobile communication system having a mobile communication network conforming to a first protocol and a plurality of communication networks conforming to a second protocol, wherein the mobile communication network conforming to the first protocol includes a switching apparatus that: obtains the service information of the subscriber terminals (11, 12, 13, . . . ) that can perform communication conforming to the first protocol from the different storing parts (211a, . . . ) in accordance with the kinds of the subscriber terminals; includes the storing means (131a) for storing the obtained service information; performs the call processes with respect to the subscriber terminals by using the service information stored in the storing means; and reflects process result information to the original storing parts (211a, . . . ) from which the information is obtained, and carries out the call processes with respect to any of the subscriber terminals (11, 12, 13, . . . ) by obtaining the service information and using the service information stored in the storing means, wherein the switching apparatus (131) is connected to the switching apparatus (211, 221, 231) in the mobile communication networks conforming to the second protocol in a direct manner or via a gateway switching apparatus.

In addition, the present invention provides a connection system in which a mobile communication network conforming to the first protocol and having a radio base station that can be accessed by either one of the subscriber terminal (11) whose service information is managed by the first carrier (OP1) and the subscriber terminal (12) whose service information is managed by the second carrier (OP2) is connected to mobile communication networks conforming to the second protocol and each operated by one of the first carrier and the second carrier, wherein the switching apparatus (131) in the mobile communication network conforming to the first protocol accesses the storing part (211a) of the service information managed by the first carrier and the storing part of the service information managed by the second carrier, and makes connection to the switching apparatus (211, 221) of at least one of the mobile communication network operated by the first carrier and the mobile communication network operated by the second carrier in a direct manner or via a gateway switching apparatus, and wherein the switching apparatus (131) in the mobile communication network conforming to the first protocol obtains, from the corresponding storing part (211) among the storing parts, service information corresponding to the subscriber terminals and performs connection processes.

Further, the switching apparatus (131) in the mobile communication network conforming to the first protocol includes the visitor information memory (131a), and stores the obtained service information in the visitor information memory.

Additionally, each of the storing parts is realized by the subscriber information memory (211a) of the switching apparatus <211> that is not connected to a mobile communication network (e.g., a mobile communication network of the OP2) different from the mobile communication network conforming to the first protocol.

Furthermore, it is preferable that the stored information be masked such that the above-mentioned stored information <service information> cannot be accessed from the mobile communication networks (the respective mobile communication networks of the OP1, the OP2, and the OP2) conforming to the second protocol.

As mentioned above, according to the present invention, when building a 3G mobile network system, by sharing the RAN part and the MSC, it is possible to significantly reduce functions required for the MSC for each provider. Hence, it is possible to significantly reduce, for example, costs and time required for system building. In addition, it is also possible to significantly reduce connection resources required for a connection between terminals subscribing to different carriers. Thus, it is possible to achieve a simple and quick connection.

The present invention is not limited to the specifically disclosed embodiments, and variations and modifications may be made without departing from the scope of the present invention.

The invention claimed is:

1. A mobile communication system comprising:
a common radio base station capable of carrying out radio communication with both a first terminal joining a first provider and a second terminal joining a second provider;
a common radio network controller configured to control the common radio base station for providing the first terminal and the second terminal with radio communications through the common radio base station;
a common switching apparatus configured to carry out switching of a communication route for communications received from the first terminal and the second terminal via the common radio network controller wherein the common switching apparatus is able to turn back the communication route to a common radio network controller not connected to a public network side;
a first management apparatus configured to manage subscriber information for the first terminal; and
a second management apparatus configured to manage subscriber information for the second terminal, wherein:
said common switching apparatus comprises a subscriber information obtaining part configured to obtain the subscriber information of a calling terminal by accessing any one of the first and the second management apparatuses, according to the provider which the calling terminal joins.

2. The mobile communication system as claimed in claim 1, wherein:
a plurality of carriers includes the first provider and the second provider;
the system is configured to share, by the plurality of carriers, the common switching apparatus that connects terminals subscribing to different carriers; and
the mobile communication system is used in a 3G mobile communication network control system.

3. The system as claimed in claim 2, wherein the common switching apparatus includes:
   a function of storing and managing information of a terminal relating to interconnection between mobile communication networks of different carriers; and
   a mask function for preventing leakage and falsification of the information.

4. The system as claimed in 3, wherein a packet communication apparatus (SGSN) can be shared by the plurality of carriers by applying the function of the shared common switching apparatus, the function storing and managing the information of the terminal relating to interconnection between the mobile communication networks of the different carriers.

5. The system as claimed in claim 2, wherein information transmitted by connecting the terminals subscribing to the different carriers is formed by voice information.

6. The system as claimed in claim 2, wherein information transmitted by connecting the terminals subscribing to the different carriers is formed by packet data.

7. The system as claimed in claim 2, further including a further common switching apparatus for an individual carrier, the further apparatus changing subscriber service and performing accounting process within a service area of a shared mobile communication network.

8. The system as claimed in claim 7, wherein a switching function of the common switching apparatus for the individual carrier is eliminated.

9. The system as claimed in claim 7, wherein consistency between subscriber information of the shared common switching apparatus and subscriber information of the common switching apparatus for the individual carrier is maintained as needed.

10. The system as claimed in claim 2, wherein a terminal subscribing to a carrier of a 3G mobile communication network is directly connected to a 2/2.5G mobile communication network subscribing to a different carrier, without using a public switched telephone network (PSTN).

11. The system as claimed in claim 2, wherein a terminal subscribing to a carrier of a 3G mobile communication network is directly connected to a public switched telephone network (PSTN) without using the common switching apparatus and a communication network for the carrier.

12. The system as claimed in claim 2, wherein a terminal subscribing to a carrier of a 3G mobile communication network is directly connected to a public packet network (PDN) without using the common switching apparatus and a communication network for the carrier.

13. The system as claimed in claim 2, further including a network management apparatus that entirely manages:
   the shared common switching apparatus; and
   a shared radio communication network in which a signal is exchanged by said shared mobile communication network.

14. A method of controlling mobile communication system as claimed in claim 1, wherein the common switching apparatus that connects terminals subscribing to different carriers is shared by a plurality of carriers.

15. The mobile communication system as claimed in claim 1, wherein the common switching apparatus that connects terminals subscribing to different carriers is configured to be shared by a plurality of carriers.

16. The mobile communication system as claimed in claim 1, wherein the common switching apparatus performs, by each carrier, change of subscriber service and an accounting process within a service area of a shared mobile communication network in a 3G mobile communication network that allows interconnection between terminals subscribing to different carriers by sharing, by a plurality of carriers, the common switching apparatus.

17. The mobile communication system as claimed in claim 1, further comprising:
   a common radio network control apparatus between the common radio base station and the common switching apparatus.

18. The mobile communication system as claimed in claim 1, wherein the first terminal, the second terminal, and the calling terminal are radio communication terminals, and the first provider and the second provider are radio communication providers.

19. The mobile communication system as claimed in claim 1, wherein the subscriber information used by the communication switching apparatus is deleted when it is not accessed for a predetermined time period.

* * * * *